(12) United States Patent
Reichl et al.

(10) Patent No.: US 7,042,209 B2
(45) Date of Patent: May 9, 2006

(54) MEASURING DEVICE FOR DETECTING A ROTATION ANGLE IN A CONTACTLESS MANNER

(75) Inventors: Asta Reichl, Stuttgart (DE); Thomas Klotzbuecher, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 10/220,024

(22) PCT Filed: Feb. 6, 2001

(86) PCT No.: PCT/DE01/00451

§ 371 (c)(1),
(2), (4) Date: Dec. 9, 2002

(87) PCT Pub. No.: WO01/63212

PCT Pub. Date: Aug. 30, 2001

(65) Prior Publication Data

US 2003/0141863 A1 Jul. 31, 2003

(30) Foreign Application Priority Data

Feb. 24, 2000 (DE) .................... 100 08 537

(51) Int. Cl.
*G01B 7/30* (2006.01)

(52) U.S. Cl. ............... 324/207.2; 324/207.25

(58) Field of Classification Search ......... 324/207.2, 324/207.21, 207.25, 174; 338/32 R, 32 H
See application file for complete search history.

(56) References Cited

U.S. PATENT DOCUMENTS

| | | | | |
|---|---|---|---|---|
| 4,401,944 A | * | 8/1983 | Narimatsu et al. | 324/207.21 |
| 4,908,527 A | * | 3/1990 | Van Antwerp | 327/511 |
| 5,394,029 A | | 2/1995 | Gay et al. | |
| 6,137,288 A | * | 10/2000 | Luetzow | 324/207.2 |
| 6,212,783 B1 | * | 4/2001 | Ott et al. | 33/1 PT |
| 6,489,761 B1 | * | 12/2002 | Schroeder et al. | 324/207.25 |
| 6,534,971 B1 | * | 3/2003 | Braun et al. | 324/207.2 |

FOREIGN PATENT DOCUMENTS

| | | | |
|---|---|---|---|
| CA | 1 232 957 A | | 2/1988 |
| DE | 19543564 | * | 5/1996 |
| DE | 197 41 579 A | | 3/1999 |
| JP | 4-248403 | * | 9/1992 |

* cited by examiner

Primary Examiner—Jay Patidar
(74) Attorney, Agent, or Firm—Ronald E. Greigg

(57) ABSTRACT

A measuring instrument for contactless detection of an angle of rotation comprises a magnetically nonconductive rotor, on which a magnet is disposed, and a stationary magnetically sensitive element for generating a measurement signal. The magnetically sensitive element has two sensitive faces spaced apart by a distance.

18 Claims, 5 Drawing Sheets

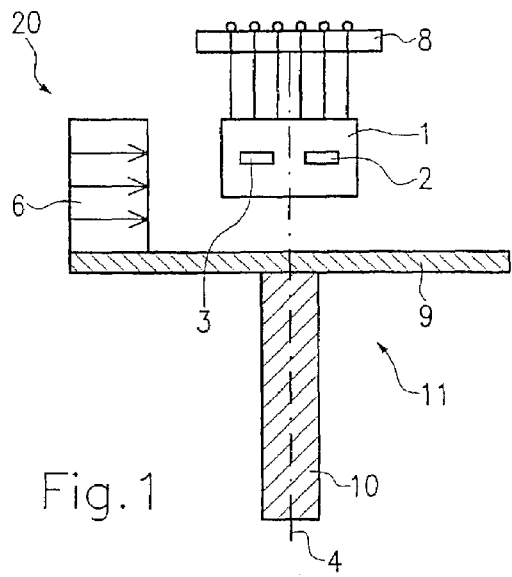
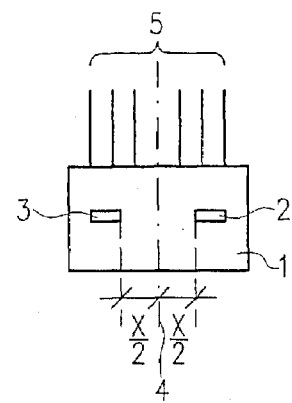
Fig.1    Fig.2
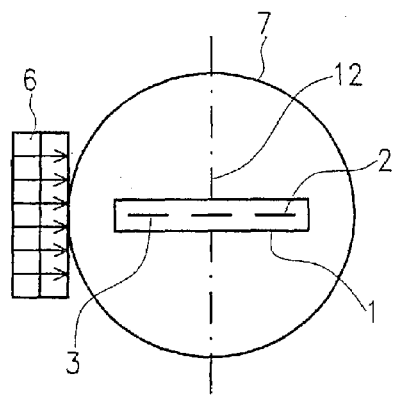
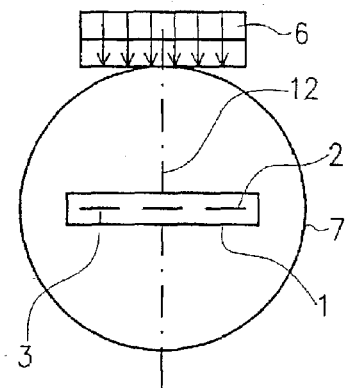
Fig.3    Fig.4

MEASURING DEVICE FOR DETECTING A ROTATION ANGLE IN A CONTACTLESS MANNER

CROSS-REFERENCE TO RELATED APPLICATIONS

This application is a 35 USC 371 application of PCT/DE 01/00451, filed on Feb. 06, 2001.

BACKGROUND OF THE INVENTION

1. Field of the Invention

The invention is directed to an improved measuring instrument for contactless detection of an angle of rotation including a magnetically nonconductive rotor supporting a magnet and a stationary magnetically sensitive element for generating a measurement signal.

2. Description of the Prior Art

In one known measurement instrument described for example in DE 197 53 775.8 A1, flux conducting parts of magnetically conductive material have been used, among other elements, for orienting the lines of magnetic flux. However, this makes these measuring instruments relatively large, and only conditionally can they be built into measurement systems. Also, in this embodiment, it is not possible to vary the slope of the linear portions of the measurement curve sufficiently.

To overcome these problems, a novel measuring instrument for contactless detection of an angle of rotation has a rotor on which a magnet is disposed and also has a magnetically sensitive element for generating a measurement signal. This rotor comprises magnetically nonconductive material, and the magnet is embodied in planar form and is disposed parallel to a plane that passes through the axis of the rotor. Furthermore, the polarization of the magnet is diametrically opposite the axis. In this measuring instrument, no flux parts are used. Moreover, the complexity of assembly of this measuring instrument is reduced sharply. On the other hand, in this measuring instrument, the linear region of the measurement curve cannot exceed 180°.

SUMMARY OF THE INVENTION

The instrument according to the invention for contactless detection of an angle of rotation has the advantage over this prior art that the two linear regions of the measurement curves of the two sensitive faces can be combined to form one continuous linear region extending up to an angle of 360°. Despite these large angular ranges, the measuring instrument of the invention is very small, and because of its simple design, it is economical.

Preferably, the two sensitive Hall faces are supplied with current oppositely from one another, so that at every instant or at every angle of rotation of the object to be measured, the precise rotary position of the object can be ascertained. This is possible by simply comparing the two output signals of the two sensitive Hall faces.

In a preferred exemplary embodiment of the present invention, the two sensitive Hall faces are disposed in the same plane. For simple positioning of the Hall element, the measurement signals of the two sensitive faces are carried away separately. Among other things, the positioning of the two sensitive Hall faces is also facilitated since the two faces, without compensation but with the same supply of current and the same influence of a magnetic field, would have to furnish the same results. This is true above all for the positions shown in FIGS. 3 and 4. To this extent, a complicated comparison with a compensation curve, as in the known measuring instruments, is unnecessary.

The magnetically sensitive element and the magnet are preferably disposed relative to one another such that they describe a circular motion relative to one another in terms of the spacing x/2 between the sensitive faces. This assures simple compensation, since the spacing between the magnet and the magnetically sensitive element remains the same, regardless of the relative angular position.

Preferably, the magnet is embodied in planar form and is disposed parallel to a plane that passes through the axis of the rotor. On the one hand, this makes a homogeneous magnetic field relative to the magnetically sensitive element possible, and on the other, it makes for insensitivity to axial offset and fluctuations in tolerances thereof.

To achieve optimally effective induction at the Hall measuring element, the polarization of the magnet is diametrically opposite the axis of the rotor.

A rectangular shape of the magnet with rounded corners, or an oval or round form of the magnet, has proved preferable.

Finally, in a preferred embodiment of the present invention, the evaluation of the output signals of the two sensitive faces is effected by means of a comparison algorithm, by which at every instant, the position of the object to be measured can be ascertained in a simple form.

BRIEF DESCRIPTION OF THE DRAWINGS

Exemplary embodiments of the invention are described in further detail herein below, with reference to the drawings, in which:

FIG. 1 is a schematic lateral sectional view of the measuring instrument of the invention for contactless detection of an angle of rotation;

FIG. 2, an enlarged view of the magnetically sensitive element of FIG. 1;

FIG. 3, a schematic plan view on the instrument according to the invention of FIG. 1, in which the polarization of the magnet is parallel to the orientation of the magnetically sensitive element;

FIG. 4, a schematic plan view on the instrument according to the invention of FIG. 1, in which the polarization of the magnet is perpendicular to the magnetically sensitive element;

DESCRIPTION OF THE PREFERRED EMBODIMENTS

Figure 5:
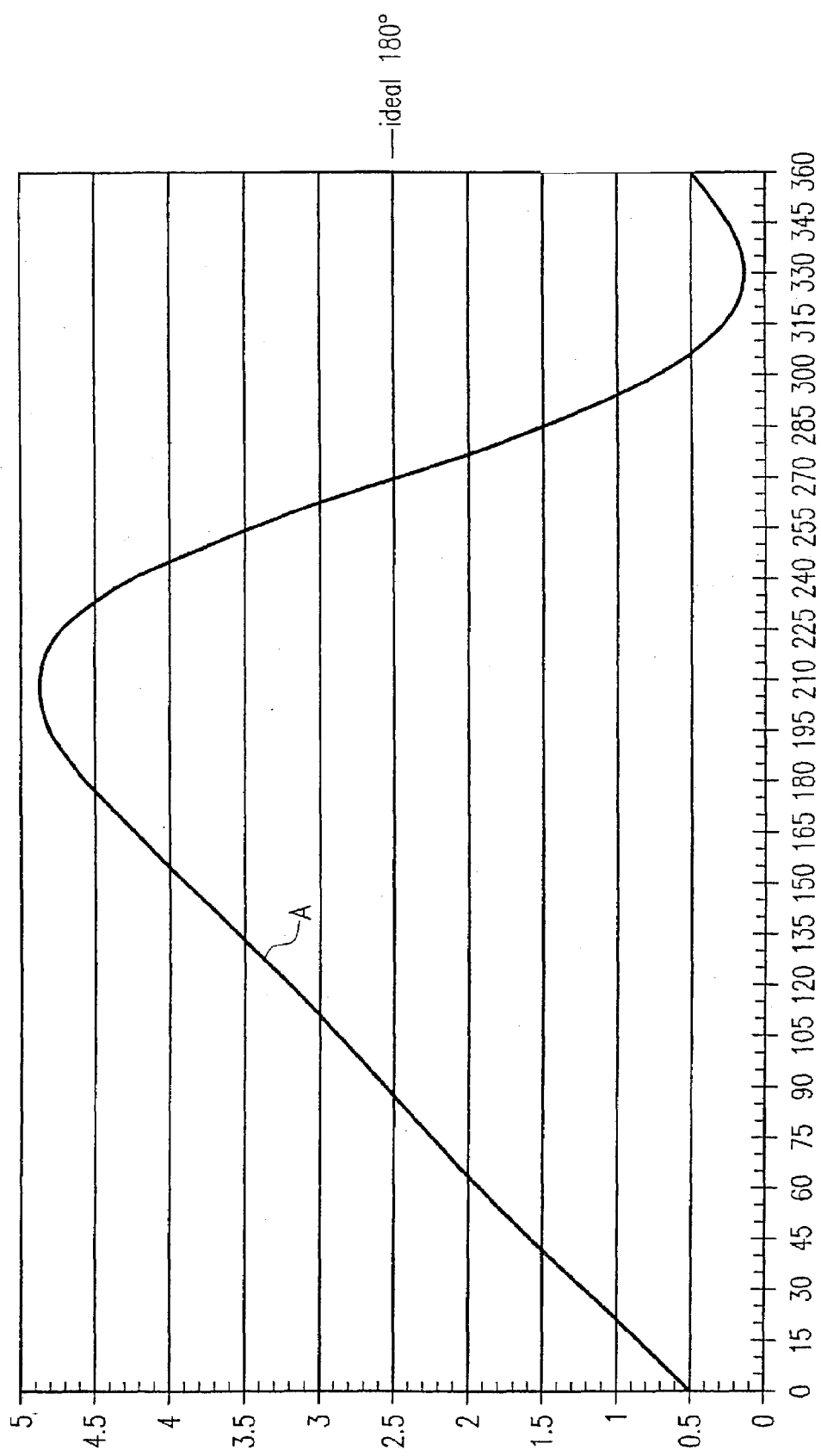
FIG. 5, the characteristic curve of the sensitive face 2.

In the drawings, 20 indicates a sensor, which is connected with the aid of a shaft 10 to a component, not shown, whose rotary motion is to be determined. A carrier plate 9 which together with the shaft 10 acts as a rotor 11 is mounted centrally on the face end of the shaft 10. At least the carrier plate 9 and in particular the shaft 10 as well comprise magnetically nonconductive material. The carrier plate 9 is embodied as a circular disk. Spaced apart from the center point of the carrier plate 9 and from the center line 4 of the shaft 10, a permanent magnet 6 is secured, for instance to the edge of the carrier plate 9, as shown in FIGS. 1, 3 and 4. The permanent magnet 6 is embodied in planar form; that is, it has no curved shape that would conform to the circular shape of the carrier plate 9.

The permanent magnet 6 is disposed parallel to the axis 4 of the shaft 10. The polarization of the permanent magnet 6 is oriented perpendicular to the axis 4. Instead of a circular carrier disk 9, the permanent magnet 6 could also be secured to an arm seated on the axis 4 or in a pot that could in turn then execute a circular motion.

A magnetically sensitive element 1 at the center point of the carrier plate 9 is disposed in stationary fashion. As shown in FIG. 1, the magnetically sensitive element 1 is connected via pins 5 to a printed circuit board 8. The magnetically sensitive element in the present case is a Hall element 1, which together with an associated circuit is disposed on the printed circuit board 8. Two sensitive Hall faces 2, 3 are integrated with the Hall element 1 and are offset to the left and right of the center line 4 by the spacing x/2. The sensitive faces 2 and 3 are supplied with current oppositely from one another and as a result produce the characteristic curves shown in FIGS. 5–7; in other words, the characteristic curves of the two sensitive faces 2, 3 are phase-offset from one another by 180°.

In the present exemplary embodiment, the two sensitive faces 2, 3 are located in the same plane, as seen from FIG. 2, which makes simple positioning of the two Hall faces 2, 3 possible.

In FIGS. 3 and 4, two different rotary positions of the rotor 11 relative to the Hall element 1 with the Hall faces 2, 3 are shown in schematic plan views. The magnet 6, with positioning represented by arrows, moves along the circular path around the Hall element 1. In FIG. 3, the polarization is parallel to the orientation of the two sensitive Hall faces 2, 3 and in FIG. 4 is perpendicular to the orientation of the two sensitive Hall faces 2, 3. Reference numeral 12 in both drawings designates the line of symmetry of the Hall element 1.

Figure 6:
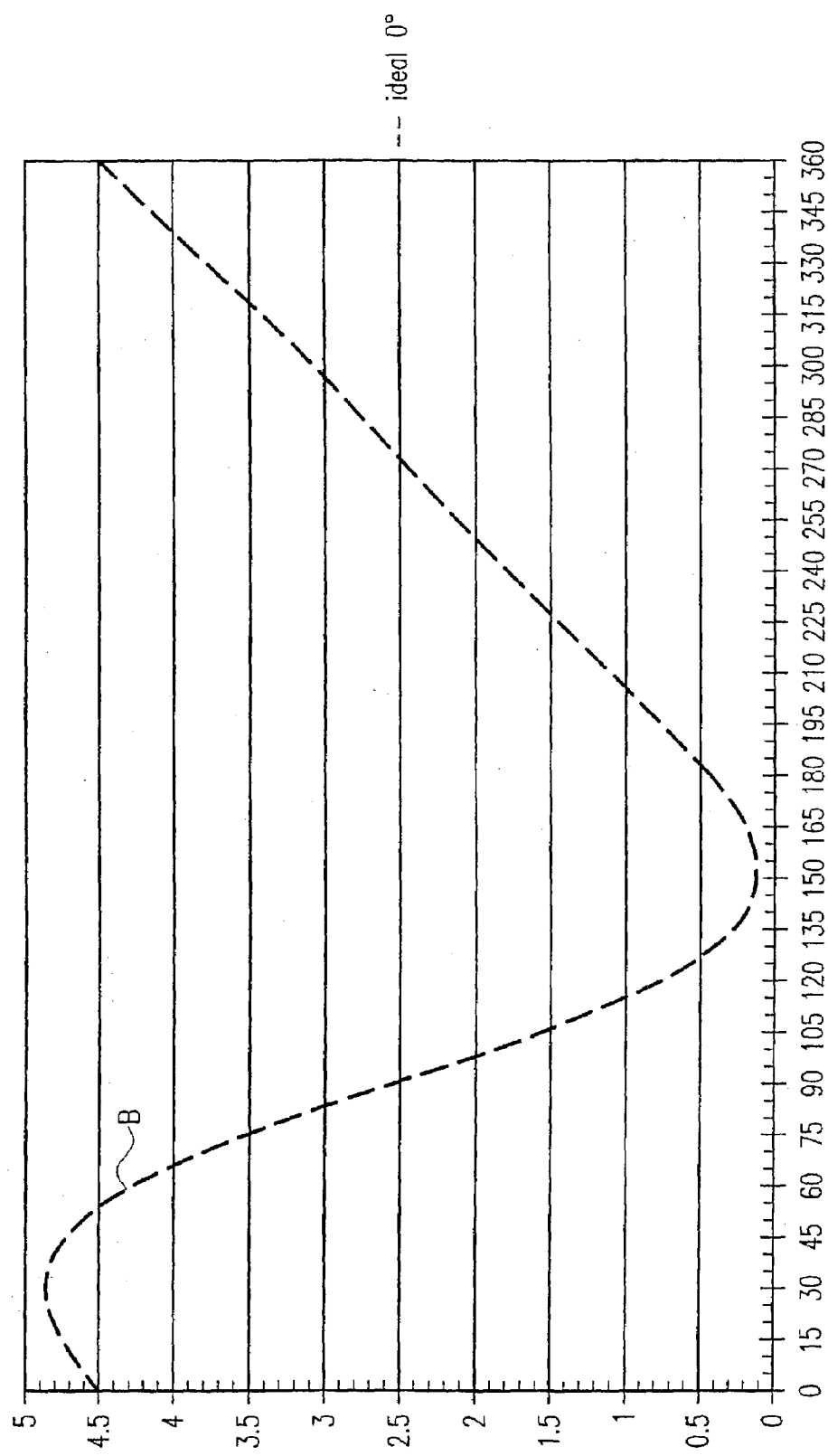
FIG. 6, the characteristic curve of the sensitive face 3.
Figure 7:
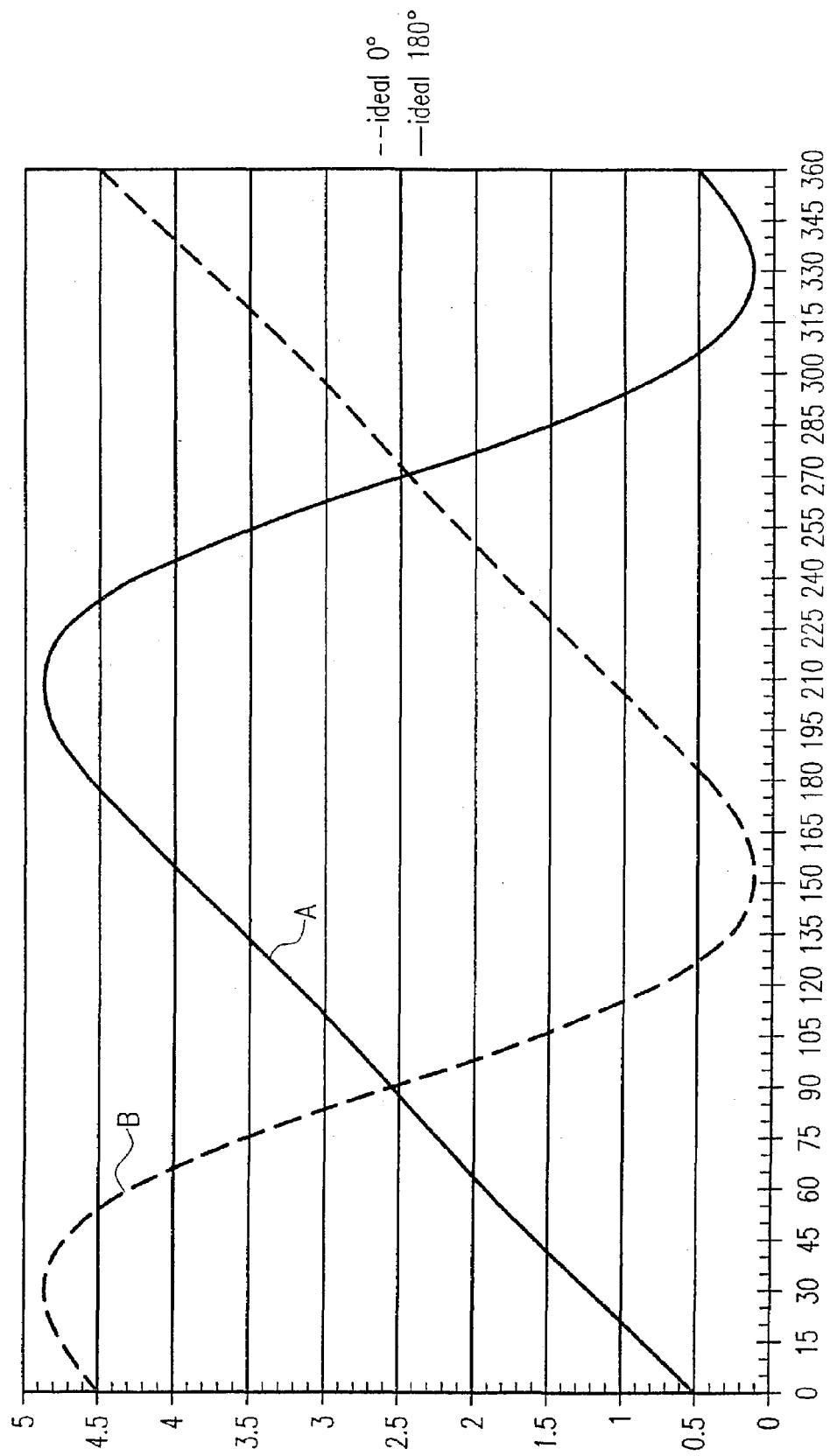
FIG. 7, the superposition of the two characteristic curves of the sensitive faces 2 and 3.

If the magnet 6 now moves, as shown in FIGS. 3 and 4, because of a rotary motion of the rotor 11, around the Hall element 1 including the sensitive faces 2, 3, then voltages are induced in the two sensitive faces 2, 3; these voltages lead to the characteristic curves shown in FIGS. 5 and 6, that is, the characteristic curve A for the sensitive face 2 and the characteristic curve B for the sensitive face 3. As shown in FIG. 7, the 180° phase displacement of the two characteristic curves A and B can be seen from the opposed current supply to the two sensitive faces 2, 3.

If the magnet 6 is positioned parallel to the sensitive faces 2, 3 of the Hall element 1, then the two sensitive faces 2, 3 must indicate the same voltage. This would correspond to what is shown in FIG. 4. For exact positioning, the relationship shown in FIG. 3 is now to be approached. Here, the magnet 6 is disposed at a right angle to the sensitive faces 2, 3 of the Hall element 1, or in other words is rotated onward by 90° relative to what is shown in FIG. 4. In this position (FIG. 3), no magnetic flux is detected by the sensitive faces 2, 3; that is, both sensitive faces indicate the neutral voltage.

Figure 8:
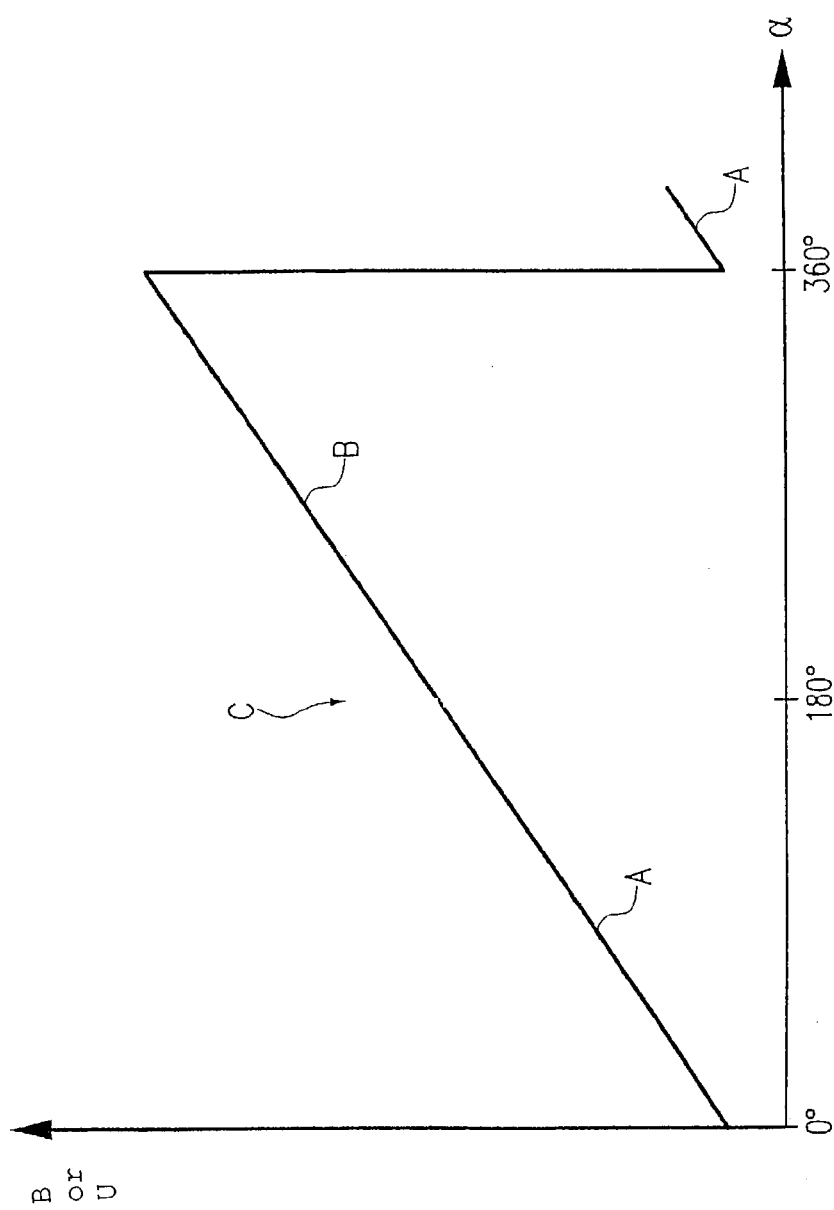
FIG. 8, a combined characteristic curve that results from a comparison algorithm employed on the two characteristic curves of the two sensitive faces.

Finally, FIG. 8 shows the outset characteristic curve C in accordance with a comparison algorithm, when the magnet 6 rotates 360°, once, around the Hall element 1. This outset characteristic curve C is linear over the entire 360° range, and as a result a very precise measurement of the respective rotary position of an object to be measured is possible.

The magnet 6 can also be a simple, small standard flat magnet. The magnet 6 can be clipped, glued or sprayed in a plastic onto the carrier plate 9.

As a result of the design of the sensor 20, large geometric tolerances in magnets 6 are allowable. If the magnet 6 has a homogeneous field in the Hall range, then the sensor 20 is insensitive to axial offsets.

Finally, it should also be noted that the positioning of the Hall element 1 along with the printed circuit board 8 relative to the magnet 6 can be accomplished without major effort by means of comparison and evaluation of the synchronism, since the output signals of the sensitive faces 2 and 3 are carried to the outside via the connection pins 5. It should also be noted that as a result of the integration of the two sensitive faces 2, 3, for instance on a leadframe, not shown, and in a housing, the spacing x/2 can be set quite precisely.

As an alternative to the disposition of the two sensitive faces 2, 3 in the same plane, the two faces can naturally be inclined counter to one another, so that regardless of the position of the Hall element 1 relative to the magnet 6, a current will always be induced in one of the two sensitive faces 2, 3. In other words, in this embodiment, which is not shown in the drawings, regardless of the positioning of the Hall element 1 relative to the magnet 6, both sensitive faces 2, 3 are never simultaneously in their orientation parallel to the polarization of the magnet 6.

The above description of the exemplary embodiments of the present invention is intended solely for illustrative purposes and is not meant to limit the invention. Within the scope of the invention, various changes and modifications may be made without departing from the scope of the invention and its equivalents.

The invention claimed is:

1. A measuring instrument (10) for contactless detection of an angle of rotation, comprising
a magnetically nonconductive rotor (11),
a magnet (6) disposed on the rotor (11), and
a stationary magnetically sensitive element (1) having two sensitive faces (2, 3) for generating a measurement signal, the two sensitive faces (2, 3) spaced apart by a distance (x), wherein the two sensitive faces (2, 3) are Hall faces and are supplied with current oppositely from one another.

2. The measuring instrument of claim 1 wherein the magnet (6) in its rotary motion revolves around the magnetically sensitive element (1).

3. The measuring instrument of claim 2 wherein the two sensitive faces (2,3) are disposed in the same plane.

4. The measuring instrument of claim 2 wherein the magnet (6) is embodied in planar form and is disposed parallel to a plane that passes through the axis (4) of the rotor (11).

5. The measuring instrument of claim 1 the two sensitive faces (2, 3) are disposed in the same plane.

6. The measuring instrument of claim 1 wherein the magnetically sensitive element (1) and the magnet (6) are disposed relative to one another such that they describe a circular motion relative to one another.

7. The measuring instrument of claim 6 wherein the magnet (6) is embodied in planar form and is disposed parallel to a plane that passes through the axis (4) of the rotor (11).

8. The measuring instrument of claim 1 wherein the magnet (6) is embodied in planar form and is disposed parallel to a plane that passes through the axis (4) of the rotor (11).

9. The measuring instrument of claim 8 wherein the polarization of the magnet (6) is perpendicular to the axis (4) of the rotor (11).

10. A measuring instrument (10) for contactless detection of an angle of rotation, comprising
- a magnetically nonconductive rotor (11),
- a magnet (6) disposed on the rotor (11), and
- a stationary unit (1) having two sensitive faces (2, 3) for generating a measurement signal, the two sensitive faces (2, 3) being spaced apart by a distance (x), wherein the two sensitive faces (2, 3) are Hall faces and are supplied with current oppositely from one another.

11. The measuring instrument of claim 10 wherein the magnet (6) in its rotary motion revolves around the stationary unit (1).

12. The measuring instrument of claim 11 wherein the two sensitive faces (2,3) are disposed in the same plane.

13. The measuring instrument of claim 12 wherein the magnet (6) is embodied in planar form and is disposed parallel to a plane that passes through the axis (4) of the rotor (11).

14. The measuring instrument of claim 11 wherein the magnet (6) is embodied in planar form and is disposed parallel to a plane that passes through the axis (4) of the rotor (11).

15. The measuring instrument of claim 10 the two sensitive faces (2, 3) are disposed in the same plane.

16. The measuring instrument of claim 10 wherein the stationary unit (1) and the magnet (6) are disposed relative to one another such that they describe a circular motion relative to one another.

17. The measuring instrument of claim 16 wherein the polarization of the magnet (6) is perpendicular to the axis (4) of the rotor (11).

18. The measuring instrument of claim 10 wherein the magnet (6) is embodied in planar form and is disposed parallel to a plane that passes through the axis (4) of the rotor (11).

* * * * *